(12) United States Patent
Tervonen et al.

(10) Patent No.: US 11,012,335 B2
(45) Date of Patent: May 18, 2021

(54) ERROR DETECTION IN COMMUNICATION NETWORKS

(71) Applicant: ARM LIMITED, Cambridge (GB)

(72) Inventors: Mika Antero Tervonen, Oulu (FI); Sven Juhani Puurula, Oulu (FI)

(73) Assignee: ARM Limited, Cambridge (GB)

( * ) Notice: Subject to any disclaimer, the term of this patent is extended or adjusted under 35 U.S.C. 154(b) by 147 days.

(21) Appl. No.: 15/703,192

(22) Filed: Sep. 13, 2017

(65) Prior Publication Data

US 2018/0091407 A1    Mar. 29, 2018

(30) Foreign Application Priority Data

Sep. 28, 2016  (GB) ..................................... 1616417

(51) Int. Cl.
| | |
|---|---|
| *H04L 12/26* | (2006.01) |
| *H04W 56/00* | (2009.01) |
| *H04L 29/08* | (2006.01) |
| *H04J 3/06* | (2006.01) |
| *H04L 29/06* | (2006.01) |
| *H04L 12/815* | (2013.01) |

(Continued)

(52) U.S. Cl.
CPC ............ *H04L 43/0852* (2013.01); *H04J 3/06* (2013.01); *H04L 43/0811* (2013.01); *H04L 43/103* (2013.01); *H04L 43/12* (2013.01); *H04L 67/145* (2013.01); *H04L 69/28* (2013.01); *H04W 56/00* (2013.01); *H04J 3/0664* (2013.01); *H04L 41/0654* (2013.01); *H04L 43/04* (2013.01); *H04L 43/0817* (2013.01); *H04L 47/22* (2013.01); *H04L 47/28* (2013.01)

(58) Field of Classification Search
CPC ............ H04L 43/0852; H04L 43/0811; H04L 43/103; H04L 43/12; H04L 43/04; H04L 43/0817; H04L 41/0654; H04L 47/22; H04L 47/28; H04L 67/145; H04L 69/28; H04W 56/00; H04J 3/06; H04J 3/0664
See application file for complete search history.

(56) References Cited

U.S. PATENT DOCUMENTS

| | | | | |
|---|---|---|---|---|
| 6,118,769 A | * | 9/2000 | Pries ..................... | H04W 56/00 370/324 |
| 6,356,555 B1 | * | 3/2002 | Rakib .................. | H03M 13/256 370/441 |

(Continued)

FOREIGN PATENT DOCUMENTS

| | | |
|---|---|---|
| CN | 105792346 | 7/2016 |
| EP | 1 626 529 | 2/2006 |
| KR | 10 081 9037 | 4/2008 |

OTHER PUBLICATIONS

Extended European Search Report dated Feb. 19, 2018 issued in EP 17192171.1, 8 pages.

(Continued)

*Primary Examiner* — Patrice L Winder
*Assistant Examiner* — Angela M Widhalm De Rodrig
(74) *Attorney, Agent, or Firm* — Nixon & Vanderhye P.C.

(57) ABSTRACT

Broadly speaking, embodiments of the present techniques provide apparatus and methods to identify and correct communication errors in a network formed of a plurality of nodes. In particular, the apparatus and methods identify synchronisation errors in a network which result in delayed propagation of messages through the network.

20 Claims, 6 Drawing Sheets

(51) Int. Cl.
*H04L 12/841* (2013.01)
*H04L 12/24* (2006.01)

(56) References Cited

U.S. PATENT DOCUMENTS

| | | | | |
|---|---|---|---|---|
| 7,304,948 B1* | 12/2007 | Ong | ......................... | H04L 47/10 |
| | | | | 370/230.1 |
| 8,644,352 B1* | 2/2014 | Hutchison | ............... | H04J 3/065 |
| | | | | 370/509 |
| 9,559,999 B1* | 1/2017 | Auchmoody | ........... | H04L 51/16 |
| 9,608,855 B2* | 3/2017 | Someya | ................ | H04J 3/0667 |
| 9,671,822 B2* | 6/2017 | Aweya | .................... | H04L 69/28 |
| 9,723,580 B2* | 8/2017 | Boehlke | ................... | H04R 5/04 |
| 9,992,088 B1* | 6/2018 | Ho | ...................... | H04L 43/0835 |
| 2001/0005361 A1* | 6/2001 | Lipsanen | .............. | H04J 3/0679 |
| | | | | 370/238 |
| 2002/0054588 A1* | 5/2002 | Mehta | ..................... | H04L 43/06 |
| | | | | 370/352 |
| 2006/0269028 A1* | 11/2006 | Bley | .................... | H04W 56/001 |
| | | | | 375/354 |
| 2007/0230434 A1* | 10/2007 | Thill | ..................... | H04J 3/0664 |
| | | | | 370/350 |
| 2009/0190571 A1* | 7/2009 | Kitz | ......................... | H04L 12/43 |
| | | | | 370/350 |
| 2009/0307715 A1* | 12/2009 | Santamaria | ............. | H04L 67/16 |
| | | | | 719/318 |
| 2010/0034191 A1* | 2/2010 | Schulz | ................... | G01D 21/00 |
| | | | | 370/350 |
| 2011/0016232 A1* | 1/2011 | Lee | ......................... | H04L 69/28 |
| | | | | 709/248 |
| 2012/0057479 A1* | 3/2012 | Maruyama | ......... | G05B 19/4185 |
| | | | | 370/252 |
| 2015/0341447 A1* | 11/2015 | Patil | .................... | H04L 67/1044 |
| | | | | 370/329 |
| 2016/0132934 A1* | 5/2016 | Hartlaub | ............ | G06Q 30/0267 |
| | | | | 705/14.64 |
| 2018/0278566 A1* | 9/2018 | Spencer | ................ | H04L 43/106 |
| 2018/0295591 A1* | 10/2018 | Eyuboglu | ........... | H04W 56/001 |

OTHER PUBLICATIONS

P. Levis et al, "The Trickle Algorithm" Internet Engineering Task Force (IETF), Mar. 29, 2011, pp. 1-13.

J. Hui et al, "Multicast Protocol for Low power and Lossy Networks (MPL); draft-ietf-roll-trickle-mcast-03", Internet Engineering Task Force (IETF), Jan. 24, 2013, pp. 1-29.

W. Bober et al, "Bailigh: Low Power Cross-Layer Data Gathering Protocol for Wireless Sensor Networks" 2009 IEEE International Conference on Ultra Modern Telecommunications & Workshops, Oct. 12, 2009, 7 pages.

C.J. Merlin et al, "Node Synchronization for Minimizing Delay and Energy Consumption in Low-Power-Listening MAC Protocols" 2008 IEEE International Conference on Mobile Ad Hoc and Sensor Systems, Sep. 29, 2008, pp. 265-274.

A. Reinhardt et al, "Remote Node Reconfiguration in Opportunistic Data Collection Wireless Sensor Networks" Proceeding of IEEE International Symposium on a World of Wireless, Mobile and Multimedia Networks, Jun. 19, 2014, 3 pages.

Search Report for GB1616417.0, dated Mar. 8, 2017, 4 pages.

* cited by examiner

Time frame in which to send message

| Min. time (s) | Max. time (s) | Threshold T1 (s) | Threshold T2 (s) | Disconnection time (s) |
|---|---|---|---|---|
| 2 | 10 | 14 | 35 | 40 |
| 16 | 32 | 40 | 120 | 130 |
| 16 | 48 | 60 | 100 | 120 |
| 60 | 120 | 200 | 350 | 400 |

ERROR DETECTION IN COMMUNICATION NETWORKS

This application claims priority to GB Patent Application No. 16 16417.0 filed 28 Sep. 2016, the entire contents of which is hereby incorporated by reference.

FIELD OF THE INVENTION

The present techniques generally relate to apparatus and methods for detecting errors in communication networks.

BACKGROUND

There are ever increasing numbers of devices within the home, office buildings or the outdoor environment that have processing and communication capabilities which allow such devices to interact with other processing devices and cloud services. Everyday objects and relatively small scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients while they are at home. In the cases described above the data is generally forwarded to a cloud service on the internet, using machine-to-machine (M2M) communication techniques.

In IoT, or in a typical M2M communication network, devices (or nodes) may be arranged in any suitable topology, such as a mesh topology (in which each node is connected to more than one other node), or a line topology (in which nodes are arranged in a line and each node is connected to the node located to the right of it). Typically, in a communication network at least one 'leader' device or 'coordinator' device is used to propagate messages to the nodes in the network. One or more nodes receive a message directly from the leader device (depending on the topology of the network), and then each node forwards the message to its neighbouring node(s) such that the message quickly propagates throughout the network. This may be an efficient way to transmit messages across a large communication network. The messages may contain new code to be implemented by the nodes in the network, for example. Whatever topology is used to arrange the nodes, as the number of nodes increases, the hop count between nodes located on the edge of the network and the leader device generally increases. This means that if any of the nodes stop working correctly or are slow to transmit messages, the nodes located far away from the leader device may not receive new messages or may receive messages a long time after they were originally sent by the leader device.

Techniques for enabling the detection of errors in a communication network are described herein.

SUMMARY

According to a first aspect of the present techniques there is provided an apparatus in a communication network, the apparatus comprising: a timer for: starting a time frame for message transmission; and determining a time delay between receiving messages at the apparatus; and a communication module for: receiving a first message, the first message having a first indicator; receiving a second message, the second message having a second indicator; determining whether the first indicator and the second indicator are different, and if so, obtaining, from the timer, a time delay between receiving the first message and the second message; determining if the time delay exceeds the duration of the time frame; and adjusting, responsive to the time delay determination, when a message is to be transmitted.

According to a second aspect of the present techniques there is provided a method for identifying message propagation delays in a communication network, the method comprising: receiving a first message having a first indicator; receiving a second message having a second indicator; determining whether the first indicator and the second indicator are different, and if so, determining a time delay between receiving the first message and receiving the second message; determining if the time delay exceeds a duration of a time frame for message transmission; and adjusting, responsive to the time delay determination, when a message is to be transmitted.

According to a third aspect of the present techniques, there is provided a non-transitory data carrier carrying code which, when implemented on a processor, causes the processor to carry out the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

BRIEF DESCRIPTION OF THE DRAWINGS

The techniques are diagrammatically illustrated, by way of example, in the accompanying drawings, in which.

DETAILED DESCRIPTION

Broadly speaking, embodiments of the present techniques provide apparatus and methods to identify and correct communication errors in a network formed of a plurality of nodes. In particular, the apparatus and methods identify synchronisation errors in a network which may result in delayed propagation of messages through the network, and/or may cause nodes to lose connectivity to the network (or synchronisation with a coordinator device in the network). The present techniques also provide a method to reduce the risk of network connectivity loss (or synchronisation loss).

The term "message" is used herein to mean any type of electronic communication sent between node devices in a communication network, and is used interchangeably herein with the terms "code", "heartbeat", "heartbeat message", "advertisement", "data" and "data packet".

The term "apparatus" is used interchangeably herein with the terms "router", "node", "node device", "constrained node", and "unconstrained node". The term "communication network" used herein generally means a computer network or data network formed of multiple computing devices (e.g. nodes) where data is exchanged between the devices. The communication network may be a mesh network, a wireless mesh network, or a constrained/low-power wireless network. Nodes within the communication network may be arranged in a mesh topology, a line topology, or any other suitable topology.

Figure 1A:
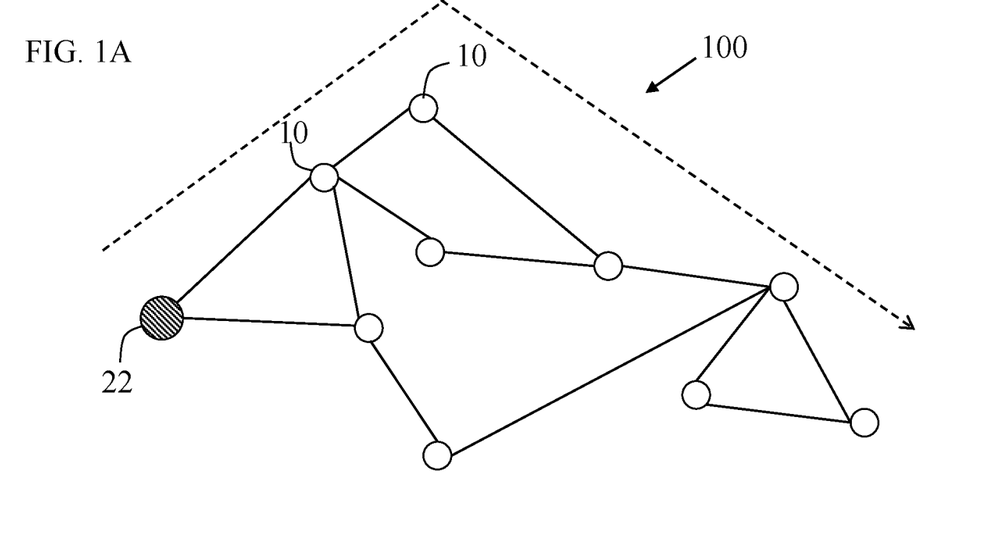
FIG. 1A is a schematic diagram of a communication network having a mesh topology.

Networks of devices (such as nodes), may be arranged in any suitable topology. Some network topologies connect nodes to multiple other nodes, while other network topologies connect nodes in a series-like connection to neighbouring nodes. A schematic diagram of a communication network 100 having a mesh topology is shown in FIG. 1A. The communication network 100 comprises a plurality of nodes 10 arranged in a mesh topology, such that each node 10 is connected to more than one other node 10. (The lines between nodes represent connections). Each node 10 may function as a router which can relay messages/data to and from the coordinator device 22 and/or other nodes in the network. Communication network 100 comprises a 'leader' device 22 (or coordinator device 22). The coordinator device 22 is the device which establishes the network 100 originally. There is, ideally, only a single coordinator device 22 per network 100. The coordinator device 22 may initiate message propagation through the network (e.g. the coordinator device 22 may send heartbeat messages), and more generally, provides information by which nodes 10 in the network 100 may determine if they are connected to other devices/nodes in the network 100.

In a mesh network, each node 10 may be configured to use broadcasting or multicasting communication techniques to transmit messages to neighbouring nodes. This may be a particularly efficient way to propagate messages in networks comprising a large number of nodes/devices. If a node in a mesh network fails, messages may still be able to propagate through the network since each node is coupled to, or able to communicate directly with, multiple nodes. Each node may automatically forward every message it receives, or may forward a message only if, for example, it receives an indication that the message has not been received by a nearby node.

Figure 1B:
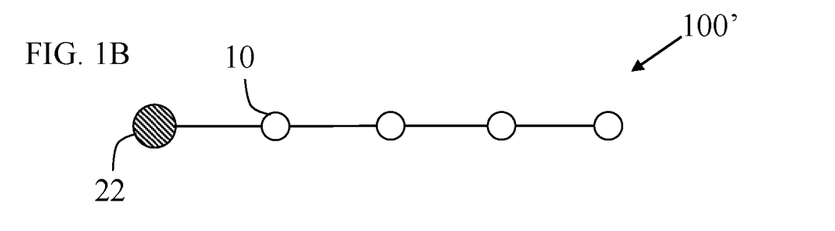
FIG. 1B is a schematic diagram of a communication network having a line topology.

FIG. 1B is a schematic diagram of a communication network 100' having a line topology. In a line topology (or a ring topology), each node 10 may be connected in a series-like connection to a nearby node. Each node may forward a message intended for a particular node until it reaches the destination. Thus, the node may use unicasting to forward messages.

As shown in FIG. 1A, a mesh network may itself comprise a line network/line topology. For example, the dashed arrow in FIG. 1A indicates a linear connection between a node 10 and the coordinator 22. There are other such line topologies within the illustrated mesh network 100. Thus, communication problems which arise in line topologies may also occur in mesh networks, though the probability of these problems resulting in a connectivity or communication failure is lower than in a pure line topology because each node in a mesh network can obtain information (e.g. messages) from another node in the network.

In the mesh network 100 or line network 100', any suitable networking protocol may be used to enable communication between the nodes 10 and devices 22. One example protocol is the Thread network protocol (http://threadgroup.org/), which is particularly suitable for Internet of Things devices (i.e. low processing power and/or low memory devices). The Thread protocol, as well as other networking protocols, may send heartbeat messages or similar advertisements to find out if the network is operating correctly/normally, and/or to synchronise the nodes in the network.

In the present techniques, a heartbeat message is a message sent to nodes 10 in a network, usually at regular intervals (e.g. every few seconds, every minute, etc.) to enable the nodes 10 to determine that they remain connected to a leader device/coordinator device. The heartbeat message may, in embodiments, be sent out at irregular intervals, as explained in more detail below. The heartbeat message may be sent periodically by the coordinator device 22 in a network, and forwarded by the nodes 10 across the network. If a heartbeat message is not received by a node 10 for some time, the node 10 assumes that it has lost connection to the coordinator device 22 (perhaps because one or more nodes have failed). In some cases, the heartbeat message may comprise an indicator (e.g. a numeric or alphanumeric indicator or index, or a timestamp) which increases in value (or otherwise changes in value) each time a new heartbeat message is sent by the coordinator device 22. If a node 10 receives heartbeat messages but does not see a change in the numerical indicator value of the messages, the node 10 may assume that it has lost connection to the coordinator device 22.

The heartbeat message may take any suitable form. For example, the heartbeat message may be a periodic advertisement sent under the Thread protocol. The heartbeat message may be any periodic message or advertisement, and may be sent under any suitable communication protocol, such as Thread, or the Websocket protocol (IETF RFC 6455), or the Proxy Mobile IPv6 protocol (IETF RFC 5847), for example. (The protocols listed here are merely exemplary and are non-limiting).

One way to send heartbeat messages is to use the Trickle algorithm (IETF RFC 6206) to quickly propagate messages through a network. The Trickle algorithm enables nodes to exchange data quickly, while reducing the number of messages that need to be transmitted and thereby reducing the risk of flooding the network with messages. Thus, the Trickle algorithm may be suitable for sending heartbeat messages which need to be sent regularly and need to reach all nodes in the network quickly, since the algorithm enables message propagation in an efficient manner. The Trickle algorithm specifies that a node transmits messages to nearby nodes unless it hears a few other transmissions that suggest the node's own message is redundant. Under the Trickle algorithm, if the node hears a message several times from other nodes/devices in the network that is the same as what the node already knows, the node does not transmit a message, which avoids flooding the network with unnecessary messages.

The Trickle algorithm specifies that time is divided into intervals of a particular, predetermined length. For example, an interval may be 60 seconds long. Each node following the Trickle algorithm is configured to transmit a message once (at the most) per interval. A node following the Trickle algorithm may decide not to transmit a message in an interval if the node has heard a message several times from other nodes in the same interval, to avoid flooding the network. The node may be listening for messages from other nodes/devices in the network, for all or part of each interval. For example, the node may be listening for a new heartbeat message. However, once the node transmits a message during an interval, it cannot (under the Trickle algorithm) transmit another message in the same interval, even if the node has heard an updated/newer message following the transmission. In the context of heartbeat messages, the node may be configured to transmit the heartbeat message having the highest index or highest numerical indicator value, which represents the newest/latest heartbeat message. The Trickle algorithm specifies that a node transmits a message at a random time during each interval. For example, for an interval of length 30 seconds, the transmission may take place at a randomly selected point in this interval, e.g. between the 16th second and 30th second. The node transmits a message at any randomly-selected point during the interval. This is to avoid all nodes in a network from sending messages at exactly the same time, which may flood the network.

Generally speaking, the Trickle algorithm is able to dynamically regulate the transmission rate of messages in the network. A default interval of length T may be defined for a communication network, e.g. by a coordinator device. When the transmissions heard by nodes are 'consistent', the nodes transmit messages less frequently, and the interval may be switched to $\tau\_low$ (i.e. a longer interval). What constitutes a 'consistent' transmission is protocol dependent. For example, a consistent transmission may be a heartbeat message with the same indicator value as the heartbeat message stored by/known by the node. This would indicate that other nodes have heard the same heartbeat message. When the transmission heard by nodes are 'inconsistent' (for example, if the node hears a newer heartbeat message), the interval may be switched to $\tau\_high$ (i.e. a shorter interval) to enable the new message to be propagated around the network quickly. After some time, the interval is switched back to $\tau$. Thus, the Trickle algorithm specifies that a node should alter the length of an interval (i.e. the frequency of communications, or communication rate) in response to 'consistent' and 'inconsistent' events.

However, while the Trickle algorithm may be able to dynamically regulate the rate of transmission in a network, the Trickle algorithm is unable to spot failures or communication errors in the network, or to rectify the communication errors. For instance, the Trickle algorithm causes a node to take action if the node hears a 'consistent' or 'inconsistent' transmission from nearby nodes, but the algorithm (and therefore the node) does not know how to determine if the transmissions are up-to-date or in sync with a coordinator device.

Thus, an apparatus and methods for identifying communication errors which may cause nodes to lose connectivity to the network (in particular, to the coordinator device) is described below, together with a method to reduce the risk of network connectivity loss. The techniques described herein may form a new communication algorithm/primitive, or may be used to modify an existing communication algorithm (such as the Trickle algorithm). The techniques described herein may be used to send heartbeat messages only, while other algorithms (e.g. the Trickle algorithm) may be used to send other types of messages within the network. Additionally or alternatively, the techniques described herein may be used to send any type of message.

In embodiments, the default length of an interval between each transmission performed by a node may be defined by the Trickle algorithm, for all message types. If the present techniques identify a communication error that may cause one or more nodes to lose connectivity to the coordinator device, the present techniques may be used to modify the gap between heartbeat message transmissions (i.e. the interval) to reduce the risk of network connectivity loss. Once the error has been resolved, the interval for heartbeat message transmissions may be reset to the default length specified by the Trickle algorithm. (The present techniques may be used to modify when heartbeat messages are transmitted. The interval between the sending of other types of message may not be modified by the present techniques, because if the present techniques reduce the risk of network connectivity loss, then there is a better chance that other types of messages will be sent and received as expected).

Figure 1C:
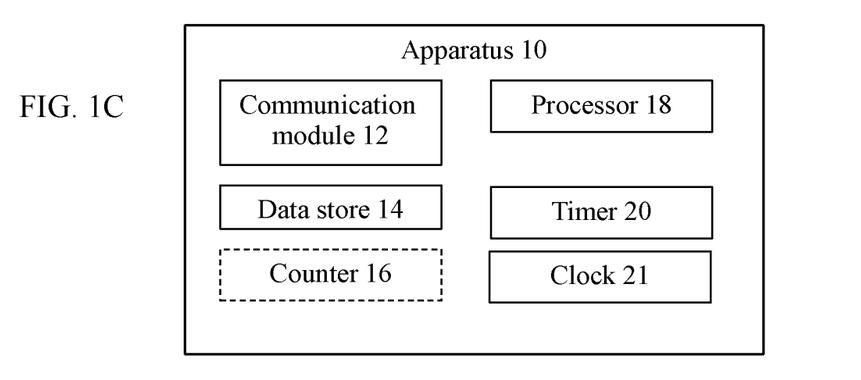
FIG. 1C shows a block diagram of an apparatus (or node device)

Turning to FIG. 1C, this shows a block diagram of a node 10 (also referred to herein as an apparatus) according to embodiments of the present techniques.

The node 10 is provided within, or part of, a communication network that comprises a coordinator device 22. The communication network may comprise a plurality of nodes 10 arranged in a mesh topology. The or each node 10 may be able to determine whether or not the node is becoming less synchronised with (or is close to losing connectivity to) the coordinator device 22, and may be able to take action to reduce the risk that other nearby nodes lose connectivity to the network (and coordinator device 22).

The apparatus 10 comprises a communication module 12 to transmit messages to, and receive messages from, other nodes/devices within a communication network in which the node is located (such as communication network 100). The communication module 12 may be any communication module suitable for sending and receiving messages, or may be a communication module configured to (or adapted to) send and receive messages. The communication module may be configured to use multicasting, broadcasting, or unicasting to forward messages to one or more nodes/devices in a communication network. The communication protocol/technique used by the communication module of the apparatus 10 may depend on the topology of the communication network, as mentioned above. The communication module 12 may receive and transmit heartbeat messages, in addition to other types of messages/data. The communication module 12 may, for example, transmit a heartbeat message periodically. The apparatus 10 may communicate with other nodes/devices in the communication network by dividing time into intervals, and sending messages to the other nodes and/or receiving messages from the other nodes during each interval. Each interval may be, by default, the same length τ, and in embodiments, the length τ may be determined, specified or controlled by the coordinator device 22 for the network. In embodiments, the length τ of each interval may be specified by a communication protocol or algorithm implementing the methods and techniques described herein. In embodiments, a default length τ of each interval (at least between heartbeat messages) may be determined using the Trickle algorithm.

The communication module 12 of each node 10 may continuously listen for messages from other nodes/devices in each interval. In embodiments, the communication module 12 may transmit a message to other nodes/devices in the communication network once in each interval. In embodiments, the communication module 12 may transmit a message even if it has already heard the same message from other nodes, in case some nodes in the network only receive messages from node 10. This may ensure that all nodes hear at least one message in each interval, whether or not the message is the most up-to-date message.

The apparatus 10 may comprise a data store 14. The data store 14 may comprise a volatile memory, such as random access memory (RAM), for use as temporary memory, and/or non-volatile memory such as Flash, read only memory (ROM), or electrically erasable programmable ROM (EEPROM), for storing data, programs, or instructions, for example. The data store 14 may store (temporarily and/or permanently) messages that are received by the communication module 12 from other nodes/devices within the communication network. For example, the data store 14 may store the latest code received from another node, or may store the latest heartbeat message that the communication module 12 has heard from another node or device in the network. The latest code may be code with the highest version number, or having some other indicator (e.g. an alphanumeric indicator, or a time or date stamp) that indicates it is the newest code. Similarly, the latest heartbeat message may be the message having the highest index, or highest alphanumeric indicator value, or latest time/date stamp, relative to what the node 10 has seen previously. The data store 14 may store the latest heartbeat message received by the communication module 12. In embodiments, if the indicator or index of a heartbeat message is not a timestamp, the data store 14 may also store the time (and possibly the date) when the heartbeat message was received by the communication module 12. This time information may enable the node 10 to determine a delay between receiving new heartbeat messages (i.e. heartbeat messages with a new indicator), which may enable the node 10 to determine if it is losing connectivity to the coordinator device 22. The data store 14 may delete/erase any older (less up-to-date) heartbeat messages stored, after the latest heartbeat message has been received and stored. This may enable the node 10 to determine if the next heartbeat message it receives is the latest heartbeat message (e.g. by comparing the index or indicator value of the stored message and the received message).

The node 10 may use the indicator of a message to determine if the node 10 remains connected to and in sync with (potentially via other nodes) the coordinator device 22 of the network, or whether the node is close to losing connection to (or synchronisation with) the coordinator device 22. The node 10 may expect to receive a new message from the coordinator device 22 (potentially via other nodes), at a particular frequency or at particular intervals. For example, the node 10 may expect to receive a new message (e.g. a new heartbeat message) once in each interval, or at irregular points within a specific time frame. For instance, if a node 10 receives a new message within a time frame in which the node 10 expects to receive a new message from the coordinator device 22 (potentially via other nodes), the node 10 may assume that it remains well connected to, or synchronised with, the coordinator device 22. (Here, a new message is defined as a message containing new information. In the case of heartbeat messages, a new heartbeat message is one having a different indicator value or index or timestamp to a previously received heartbeat message). Similarly, if a node 10 receives a new message outside of the time frame in which the node 10 expects to receive a new message from the coordinator device 22 (directly, or indirectly via other nodes), the node 10 may assume that it is still connected to the coordinator device but may be losing connection to (or is becoming less synchronised with) the coordinator device 22. In embodiments, if the node uses the indicator to determine that it is losing connection to (or becoming less synchronised with) the coordinator device 22, the node 10 may alter the point at which it transmits a new message to other nodes in the network. This process may prevent communication errors from propagating through the network, as explained in more detail below.

In embodiments of the present techniques, the indicator of a message may be a numerical indicator, an alphabetic indicator, or an alphanumeric indicator. (It will be understood that these are merely example types of indicator, and are non-limiting). The indicator may increase sequentially, and in this case, determining whether a received message is the latest message may simply comprise comparing the indicator value of a stored (or last received) message to the newly heard/received message. The time at which each message is received by the node 10 may also be stored in data store 14, as this may enable the node 10 to determine if the delay between receiving new messages is becoming too great (which may be indicative of potential network connectivity loss).

Additionally or alternatively, the indicator of a message may be a timestamp, e.g. the time and/or date at which the message is sent by the originating device (e.g. the coordinator device 22). The indicator (i.e. timestamp) may increase chronologically. Messages having timestamp-based indicators may be sent periodically/regularly, or may be sent at random intervals and as often as required. In this embodiment, determining whether a received message is the latest message may simply comprise comparing the timestamps of a stored (or last received) message and the newly heard message. The node 10 may be able to determine how 'in sync' the node is with the coordinator device 22 by comparing the timestamp of the newly heard message with the current time (as measured by a clock 21 of the node 10, for example).

Additionally or alternatively, the indicator of a message may be a random number or random sequence of characters (e.g. letters, numbers, special characters, etc.) In this case, determining whether a received message is the latest message may comprise comparing the indicators to determine if the received message is new (relative to a stored message or the last received message), and if so, determining if the message has been received within a time frame in which the node 10 expects to receive a new message from the coordinator device 22. The time at which each message is received by the node 10 may also be stored in data store 14, as this may enable the node 10 to determine if the delay between receiving new messages is becoming too great (which may be indicative of potential network connectivity loss).

Additionally or alternatively, the indicator of a message may be one of a set of characters (or a set of sequence of characters), wherein the coordinator device 22 cycles through the set of characters. For example, the set may comprise the numbers 1, 2, 3 and 4, and the coordinator device 22 may cycle through the numbers to obtain an indicator for each new message. (That is, the first message has indicator value 1, the second message has indicator value 2, the fifth message has indicator value 1, etc.) In this embodiment, determining whether a received message is the latest message may comprise comparing the indicators to determine if the received message is new (relative to a stored message or the last received message), and if so, determining if the message has been received within a time frame in which the node 10 expects to receive a new message from the coordinator device 22. The time at which each message is received by the node 10 may also be stored in data store 14, as this may enable the node 10 to determine if the delay between receiving new messages is becoming too great (which may be indicative of potential network connectivity loss).

The apparatus 10 may comprise a processor 18, which may be coupled to the communication module 12 and data store 14 (in addition to other components of the apparatus 10). The processor 18 may comprise processing logic to process data (e.g. messages received from other devices within the communication network), and generate output data in response to the processing. The processor 18 may comprise one or more of: a microprocessor, a microcontroller, and an integrated circuit. For example, the processor 18 may be configured to determine if the node 10 has received the latest/newest message, and determine if the newest message has been received in the expected time frame. In embodiments, the communication module 12 may comprise a dedicated processor 18 that is configured to make such determinations.

Figure 2A:
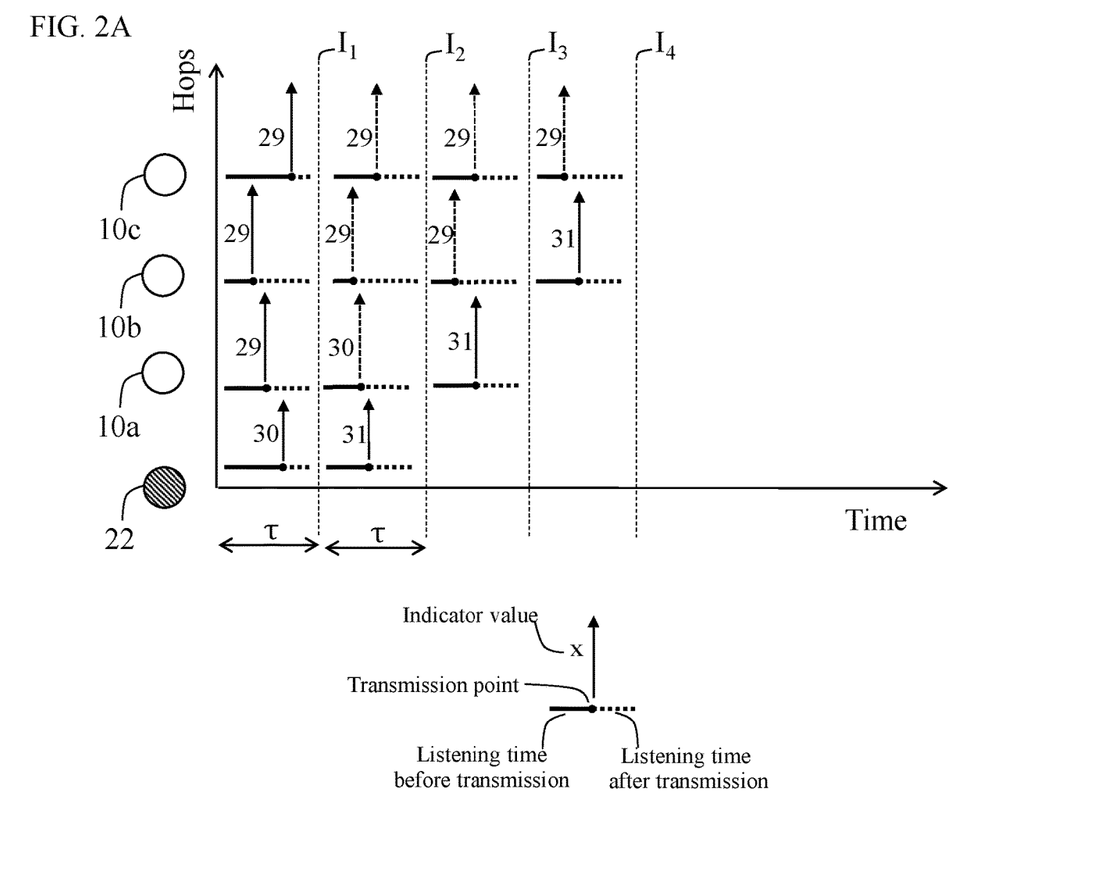
FIG. 2A is a schematic diagram illustrating one-way synchronisation errors may occur in a communication network comprising multiple node devices.
Figure 3:
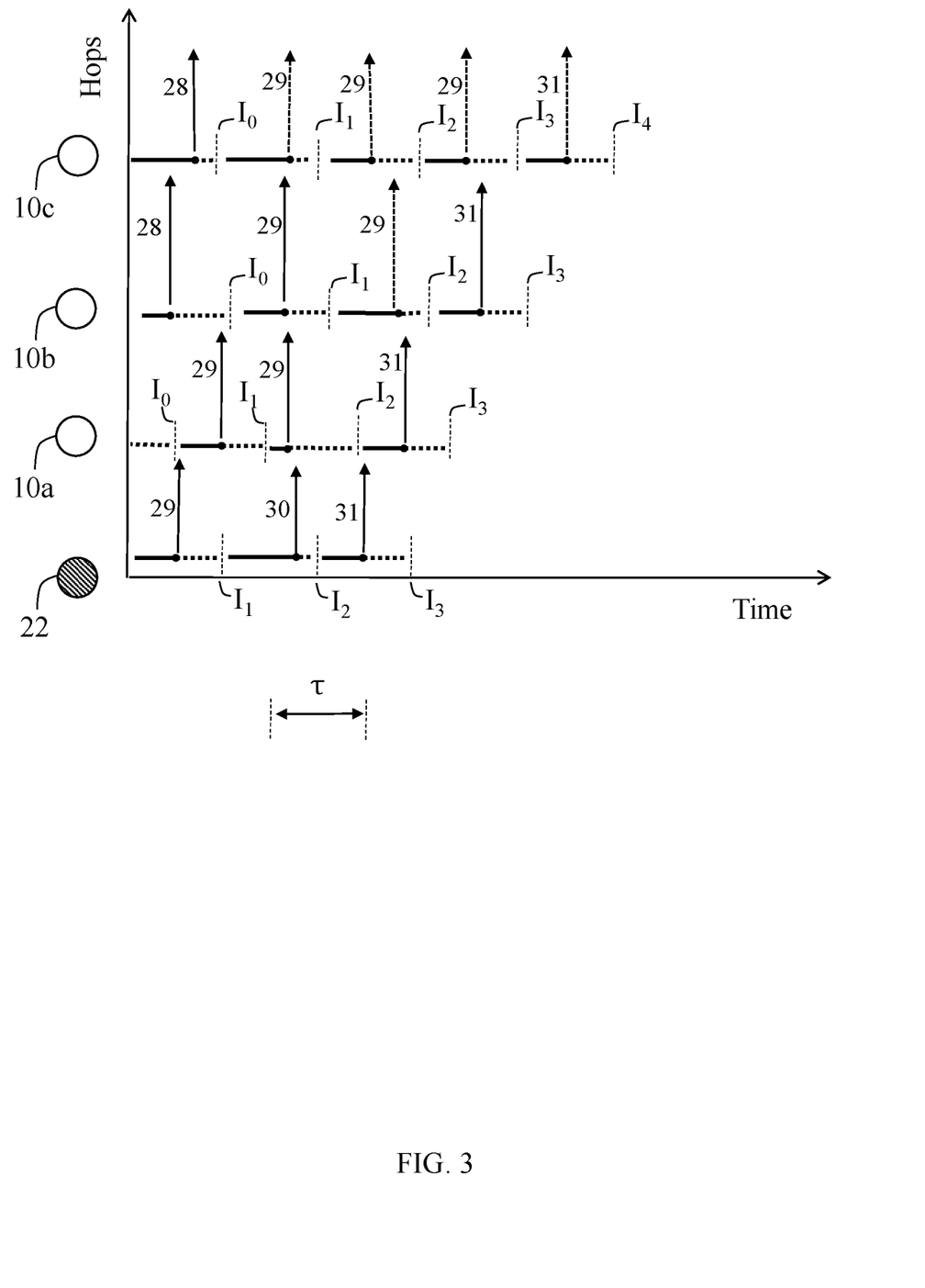
FIG. 3 is a schematic diagram illustrating a further way synchronisation errors may occur in a communication network comprising multiple node devices.

As mentioned above, the apparatus 10 may communicate with other nodes at least once in each time interval 'I'. The time interval may have a predetermined length τ, which may be specified by the protocol which implements the techniques described herein, or chosen to suit such a protocol. For example, the interval could be 30 seconds long, 60 seconds long, etc. In embodiments, the intervals 'I' may be defined (or clocked) by the coordinator device 22 in the network, such that the coordinator device 22 specifies when each new interval 'I' begins. Each apparatus 10 in the network may synchronise with the coordinator device 22, such that the node marks out the start and end point of each interval 'I' at the same points in time as the coordinator device 22. (This is shown in FIG. 2A). Alternatively, each apparatus 10 may start and end each interval itself such that the apparatus 10 is not necessarily synchronised with other devices in the network. (This is shown in FIG. 3). In embodiments, each apparatus 10 is not necessarily in sync with the coordinator device 22 and/or other nodes. The length of each interval may be the same for each device/node within a communication network, and the interval length T may be defined by a particular algorithm (e.g. the Trickle algorithm). However, the start of each interval may not be synchronised across all nodes/devices, i.e. may be out of phase. (This may be because it is difficult to synchronise hundreds or thousands of devices within a network, and/or because clocks within nodes are not accurate and may drift over time, causing the intervals to become out of phase).

Whether the intervals of each node/device are in phase or out of phase, each node 10 in the network implements the same communication protocol and algorithm as the coordinator device 22, and therefore knows how long the intervals 'I' are. The apparatus 10 may comprise a timer 20 to track the length of each interval 'I', so that the apparatus 10 knows when each interval begins and ends. Additionally or alternatively, the apparatus 10 may use clock 21 (or an external clock accessible by each node and device in the network) to track the intervals 'I', which may enable each apparatus 10 to better synchronise with the coordinator device 22. The timer 20 or clock 21 may track the start and end of each interval 'I', so that the communication module 12 can determine when to transmit a message in each interval.

The communication module 12 may transmit a message once in each interval 'I' and may select a random point within the interval to make the transmission. For example, if the length of each interval is τ, then the communication module 12 may be configured to transmit a message at a random point during a particular time frame within each interval, e.g. between τ/2 and τ in each interval, or between τ/4 and ¾ τ. (It will be understood that these are merely illustrative examples of when a message may be sent, and are non-limiting). The node 10 transmits a message at a random point within the interval to avoid all nodes in the network from sending messages at exactly the same time, which could flood the network. The timer 20 (or clock 21) may enable the communication module 12 to decide when to transmit a message within each interval.

The timer 20 may also be used to track a time delay between receiving new messages. For example, if a node 10 receives a message 'A', and if the node 10 then receives a message 'B', the timer 20 may be used to determine the time delay between receiving message A and message B. Alternatively, if the data store 14 stores the time at which message A is received and the time at which message B is received, the timer 20 or the processor 18 may be able to determine the time delay between the two messages. The time delay (or time gap) between the two messages may indicate whether the node 10 is synchronised with the coordinator device (or how out-of-sync the node 10 is). If, for example, the time gap is over a first threshold (T1) value, the node 10 may be configured to speed-up the time at which the node 10 next transmits a message. If the time gap is approaching, or reaches, a second threshold (T2) value, the node 10 may be configured to transmit a message immediately. This is explained in more detail below.

Optionally, the apparatus 10 may comprise a counter 16 to count how many times a particular message is received by the communication module 12 in an interval 'I'. The communication module 12 may be configured to, in this embodiment, transmit a message only if the communication module 12 has not already heard the same message from other nodes. However, as mentioned above, the apparatus 10 may be configured to transmit a message in each interval, even if the apparatus 10 hears the message several times from other nodes, because some nodes may rely on apparatus 10 for new messages. Therefore, to ensure that a message (even a stale or old message) is heard by all nodes within a network, each apparatus 10 may transmit the latest message it has heard itself (even if this message is becoming old, or is old) in each interval.

FIG. 2A is a schematic diagram illustrating how communication errors (or synchronisation errors) may arise in a communication network comprising multiple nodes. The errors may occur even if there are no problems in the sending and receiving processes within each node/device, and even if the communication network is otherwise working as expected. In the illustrated example, the network comprises a coordinator device 22 which may initiate message propagation through the network, and at least three nodes 10a, 10b and 10c, which are nodes of the type shown in FIG. 1C. The coordinator device 22 may generate and transmit heartbeat messages, for example, where each heartbeat message comprises an indicator. The nodes 10a-10c propagate the heartbeat messages through the network.

The nodes 10a-c and the coordinator device 22 may each transmit messages once in each interval 'I'. Each interval 'I' has a length or duration τ. In this example, the intervals of each node 10a-c and the coordinator device 22 are in phase with each other, such that each interval starts at the same point in time within each node/device. An alternative version, where the intervals are not in phase, is shown in FIG. 3. As shown in FIG. 2A, node 10a is closest to the coordinator device, i.e. one hop away, while node 10c is the furthest away from the coordinator device 22, i.e. three hops away. The nodes 10a-c may be arranged in any topology, e.g. mesh or line topology. During each interval 'I', each node 10a-c listens for messages from nearby nodes and/or from the coordinator device 22. In embodiments, each node may be listening during the entire duration T of an interval 'I', and may be able to receive/hear any number of messages from other nodes or devices in the network. However, the node may be configured to transmit a message only once in each interval 'I', such that even if the node receives an updated message after it has transmitted a message in the interval, the node cannot send a second, updated message during the same interval. Thus, after transmission, the node may continue listening for messages from other nodes/devices.

Accordingly, as shown in FIG. 2A, each interval may be considered to comprise a randomly selected transmission point, i.e. the point during the interval at which a node or the coordinator device 22 transmits a message. This is represented by a black circle and an upwards arrow in FIG. 2A. The time remaining in the interval 'I' is indicated by a dashed line, to represent the time during which a node cannot send a further transmission (but may continue listening for messages). This may be considered the 'listen only time'. As the time at which a node 10a-c may transmit a message within an interval is random (as explained earlier), the black circle may not be in exactly the same position within each interval. If a new message is heard by the node 10 during the time before a transmission is made (indicated by a solid line in FIG. 2A), the node 10 transmits the new message in the interval. If the new message is heard by the node 10 during the 'listen only time', i.e. after a transmission has already been made, the node 10 will have transmitted out-of-date or stale information within the interval.

As shown in FIG. 2A, in the first interval $I_1$, the coordinator device 22 transmits a new message. This may be any message, e.g. new code, new instructions, or a new heartbeat message. For the sake of simplicity, FIG. 2A is described by referring to heartbeat messages, but it will be understood that this is a non-limiting example. The heartbeat message transmitted by coordinator device 22 has an indicator value of 30, as shown. The heartbeat message 30 may be heard by nearby nodes within the same interval. Ideally, the heartbeat message 30 is heard by node 10a in interval $I_1$ before node 10a has made a transmission. However, in this case, the node 10a has already made a transmission within interval $I_1$, before it hears the latest message (heartbeat message 30) from the coordinator device 22. Node 10b hears the old message (heartbeat message 29) in interval $I_1$ from node 10a and therefore transmits an out-of-date message to node 10c. Therefore, in some cases, a heartbeat message may not be heard by nearby nodes within the same interval as the heartbeat message was sent by the coordinator device 22. Similarly, in some cases, a heartbeat message may be heard by nearby nodes within the same interval, but only after a nearby node has already transmitted a message within that interval, such that the nearby node cannot transmit the new heartbeat message in the same interval. As shown in FIG. 2A, node 10a does not hear the heartbeat message 30 transmitted by coordinator device 22 in interval $I_1$ within the same interval. This means that during interval $I_1$, node 10a transmits the latest message it has received, which in FIG. 2A is a stale or out-of-date message (i.e. heartbeat message 29) relative to the coordinator device 22. Accordingly, as shown, each node 10a-c transmits the most up-to-date message the node has received or stored in interval $I_1$.

During the second interval $I_2$, the coordinator device 22 transmits a new heartbeat message having an indicator value of 31. However, during the second interval $I_2$ node 10a does not hear the new heartbeat message 31 before it has made a transmission. Therefore, in interval $I_2$, node 10a sends the most recent heartbeat message it has received (i.e. heartbeat message 30), and only hears heartbeat message 31 after the node 10a has transmitted the out-of-date message. Accordingly, in interval $I_2$, node 10a transmits the heartbeat message 30 to nearby nodes. Node 10a is now one message behind the coordinator, and is forwarding out-of-date message 30 to the other nodes in the network. This communication error propagates through the network. For example, in interval 12, nodes 10b and 10c transmit the heartbeat message 29, because this is the most up-to-date message they have heard.

In the third interval $I_3$, node 10b transmits a message (heartbeat message 29) before it has heard the latest message (heartbeat message 31) from node 10a. Thus, if a node transmits a message before it has heard the newest message (or any message) from a nearby node, the node transmits an out-of-date (stale) message. Accordingly, out-of-date (stale) messages may propagate through a network because one or more nodes transmit a message before receiving an update. This may occur if one or more nodes are becoming less synchronised with the coordinator device 22. The problem may arise in some cases if the nodes are configured to transmit messages at a random time within each interval. For example, if a node randomly transmits a message near the start of the interval, or near the start of the transmission portion of an interval, the node may not have spent long enough listening for updates/new messages and may not therefore, have heard the latest message before performing the transmission. As shown in FIG. 2A, node 10b transmits an out-of-date heartbeat message 29 in interval 13 because it transmitted a message before it had received the update from node 10a. In interval $I_3$, node 10a transmits the newest heartbeat message 31, and since this is received by node 10b before node 10b makes the next transmission (i.e. in interval $I_4$), node 10b transmits the newest heartbeat message 31 in interval $I_4$.

FIG. 2A shows that node 10c has not received any updated messages over the course of four intervals. This is because in intervals I₁ to I₃, node 10c receives out-of-date data from node 10b, and because in interval 14, node 10c transmits a message (heartbeat message 29) before it has heard the newest message (heartbeat message 31) from node 10b. Thus, node 10c does not see a change in the heartbeat message index (or some other indicator in a message, e.g. a version number or timestamp), for a long period of time. Node 10c determines that it has likely lost connection to the coordinator device 22. Thus, FIG. 2A shows how nodes may become out-of-sync with the coordinator device 22 and/or other parts of the network, even if the nodes/devices are not experiencing send and receive errors, or even if there are no communication problems with the network itself.

Figure 2B:
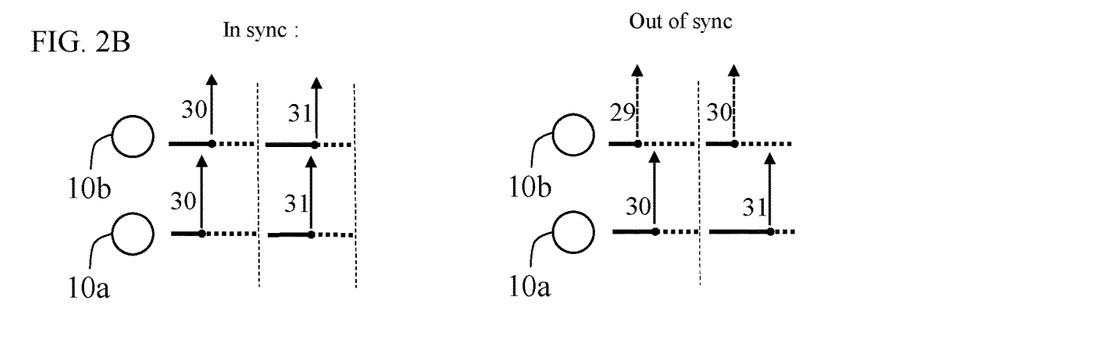
FIG. 2B is a schematic diagram illustrating an in-sync transmission (left) and an out-of-sync transmission (right)

FIG. 2B is a schematic diagram illustrating an in sync transmission (left) and an out of sync transmission (right). The in sync transmission occurs when a node (node 10b) hears a new message (e.g. a new heartbeat message) within an interval before making a transmission, and then transmits the new message within the same interval. The node 10b hears the new message in the same interval in which the message is transmitted by node 10. The out of sync transmission occurs if a node transmits a message before it has heard a newer message. That is, node 10b transmits message 29 before it has heard the newer message 30 from node 10a. As a result, node 10b causes other nodes to hear an out-of-date message, such that other nodes may become out-of-sync.

The error may arise because of the way heartbeat messages are sent under particular communication algorithms or protocols. For example, as described above, a message may be sent at a random point within a specific time frame during each interval, e.g. between τ/2 and τ, or between τ/4 and ¾ τ, etc. However, if a particular node does not listen for long enough during an interval, the node may transmit a message before it has heard a new message from another node. For example, a first node may decide to transmit at ¾ τ in an interval, while a second node may decide to transmit at τ/2 in the same interval. As a result, the second node may have already made a transmission before hearing a new message from the first node. As shown in FIG. 2A, this may not cause a loss of synchronisation with the coordinator device 22 because a node should catch-up and send the up-to-date message in the next interval (e.g. as node 10b does in interval I₂). Ideally, each node would be synchronised with the coordinator device 22, or configured to only send a message once it has received an up-to-date message, but this is difficult to achieve in large-scale networks and may result in flooding or significant delays in propagation. For instance, if each node waits for a more up-to-date message before making a transmission, the nodes could potentially fail to transmit a message in an interval because the interval expired before the nodes heard anything. In particular, if each node waits for an up-to-date message before making a transmission, nodes further away from the coordinator device 22 may become even more out-of-sync with the coordinator device 22. Nodes far away from the coordinator device 22 which don't receive a new heartbeat message for some period of time may assume that they have lost connectivity with the coordinator device 22. These nodes may need to take action in order to reconnect, or re-synchronise, with the coordinator device 22.

As mentioned above, in FIG. 2A, the intervals 'I' may be defined (or clocked) by the coordinator device 22 in the network, such that the coordinator device 22 specifies when each new interval 'I' begins. The coordinator device 22 may implement the Trickle algorithm, which specifies the length of each interval 'I'. In this example, each node 10a-c synchronises with the coordinator device 22, such that the node 10a-c marks out the start and end point of each interval 'I' at the same points in time as the coordinator device 22. This may be achieved by synchronising the clock 21 of each node and device, or by configuring each node and device to refer to a common clock (e.g. a clock accessible by all nodes and devices in the network). The coordinator device 22 may then indicate to each node when to start the first interval. However, this may be an inefficient way to synchronise the devices and nodes in a network.

FIG. 3 is a schematic diagram illustrating how communication errors (or synchronisation errors) may arise in a communication network comprising multiple nodes. Compared to FIG. 2A, in FIG. 3, the coordinator device 22 and each node 10a-c may start and end each interval itself such that the nodes and coordinator device may not necessarily be synchronised (or in phase) with each other. As all the nodes and devices are following the same communication protocol and algorithm, each node and device knows that an interval has a specific length, τ, and know the time frame in each interval during which they may make a transmission. As shown in FIG. 3, this means that a node may start and end an interval at different times relative to neighbouring nodes. Therefore, while this arrangement may remove the need for each device and node to use the same clock, this arrangement may increase the likelihood of synchronisation errors and stale messages propagating through a network.

Figure 6:
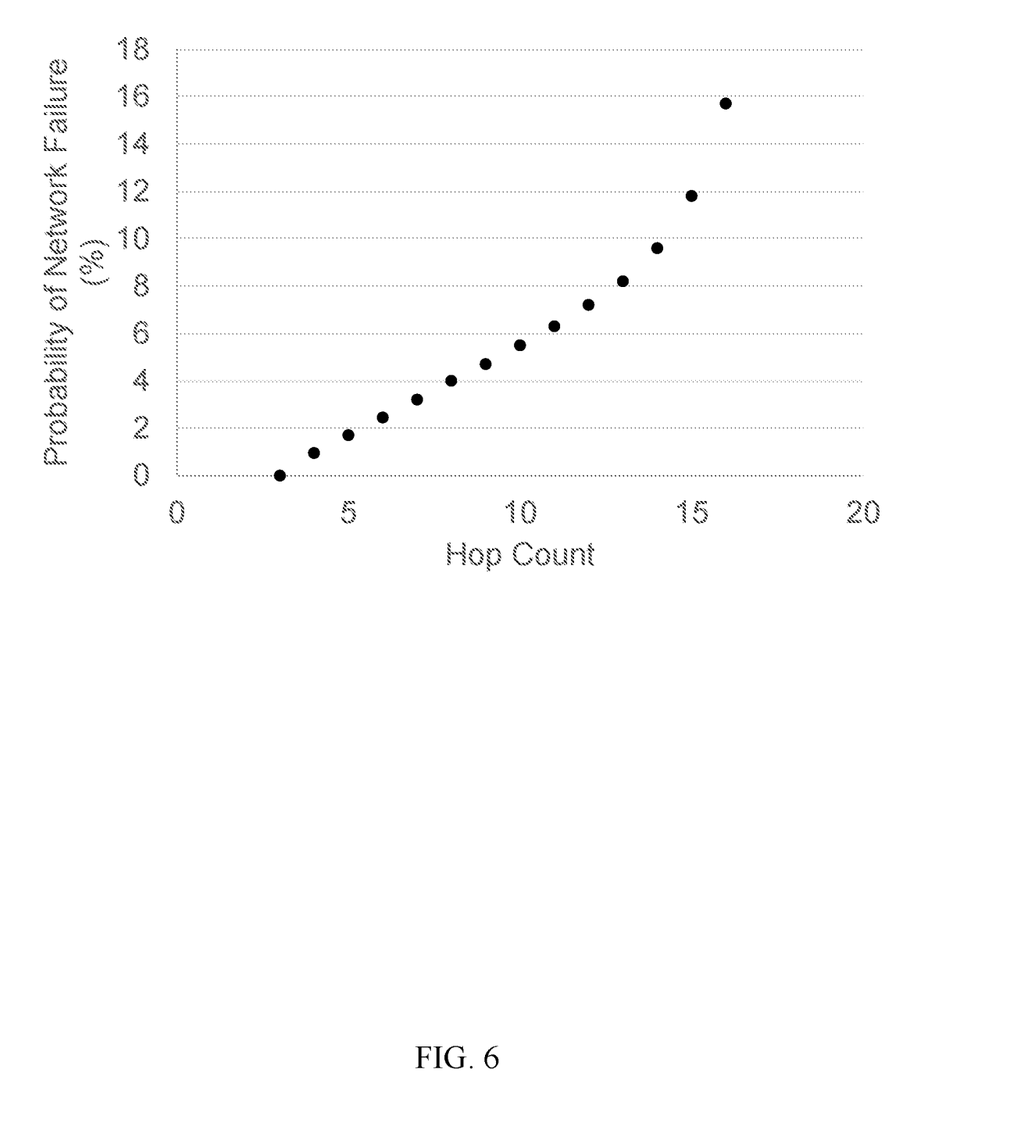
FIG. 6 is a graph illustrating how the probability of communication errors (failures) increases as the hop count between a leader device and a node increases.

Synchronisation errors, and the possibility of losing connection to the coordinator device 22 entirely, may become more likely as the distance or hop count between a node 10 and the coordinator device 22 increases, (regardless of which of the arrangements shown in FIGS. 2A and 3 are used). FIG. 6 is a graph illustrating how the probability of synchronisation errors (failures) may increase as the hop count between a coordinator device and a node increases. The graph is based on a model of network failure in a network comprising multiple nodes and which uses the Thread communication protocol. The graph shows the probability of network failure, i.e. the likelihood that a node does not hear a new heartbeat message for four intervals and becomes disconnected from the rest of the network, as a function of hop count from the coordinator device. (This is a specific model based on the Thread protocol, in which the lack of an update for four or more intervals causes a node to disconnect from the network and coordinator device, and form its own sub-network (or network partition). However, the problem has been observed in communication networks implementing other protocols). No failures occur until a node which is four hops away from the coordinator device, but then as the hop count increases, the probability of network failure rapidly increases.

Simulations of networks having differing numbers of maximum hop counts were also performed. (All other parameters of the network, such as the interval length, were kept the same in each simulation. Only the network node count varied between the simulations as the line topology—hop count—was varied). The Thread protocol specifies that four-hops is the minimum number of hops permitted between a coordinator device and node. A four-hop network implementing the Thread protocol, for example, may run for at least three hours without encountering any communication errors of the type shown in FIGS. 2A and 3, and described above. The Thread protocol specifies that 16-hops is the maximum number of hops permitted between a coordinator device and a node, but such a network may lose coherence (i.e. synchronisation with the coordinator device) before the network has fully formed. A nine-hop network which implements the Thread protocol falls between these minimum and maximum hop counts—such a network was observed to fully form but to start failing within ten minutes. One of the reasons why failures of this type can be fatal for a network of connected devices is because when a node does not see any change in the message it is hearing from nearby nodes (e.g. no change in heartbeat index), the node may realise that it has lost connectivity to the coordinator device. This loss of connectivity is more difficult to fix and it may be simpler to reduce the chance that nodes lose connectivity to the coordinator device.

Accordingly, the present techniques provide a method of identifying and reducing the above-described synchronisation errors in a network which may result in delayed propagation of messages through the network, and may thereby cause nodes to lose connectivity to the network. Embodiments of the present techniques identify synchronisation errors of the type described above and rectify them by modifying when, i.e. how quickly, a node transmits a message within an interval.

The present techniques are described with reference to an illustrative example. In this example, in a first time interval, node 10 receives a first message from a nearby node (or the coordinator device 22), stores the message in data store 14, and transmits the first message to nearby nodes using communication module 12. The first message comprises an indicator (e.g. a timestamp, index, version number or other indicator) which can be used to identify how 'new' or up-to-date the message is, as explained earlier. At some later time, node 10 receives a second message having an indicator. The node 10 determines (e.g. using processor 18) whether there is a difference between the indicator of the first message and the indicator of the second message. This may be a simple subtraction if the indicators are numerical values or indices, or may be a comparison if the indicators are timestamps. Other techniques to determine the difference between the indicators are described above.

In this example, if the node 10 determines that there is a difference between the indicators of the first and second messages (which means the messages are different), the node 10 then determines the time delay (or time gap) between receiving the two messages. This may be determined if a time associated with the receipt of each message has been stored within the data store 14, or if the messages themselves contain a timestamp. If the time delay between receiving the two messages is within an expected time frame, the node 10 determines that the node is still well synchronised with the coordinator device 22. However, if the time delay between receiving the two messages falls outside of the expected time frame, the node 10 determines that the node is starting to become less synchronised with the coordinator device 22 (which may result in connectivity loss). Depending on how large the time delay is, the node 10 alters the time at which it sends a transmission. A relatively small time delay may cause the node 10 to hasten the next transmission (because the time delay is not considered large enough to cause significant synchronisation errors), while a larger time delay may cause the node to make the next transmission immediately (because the time delay may cause significant synchronisation errors and potentially a connectivity failure).

The magnitude of the time delay between receiving the first message and receiving the second message enables the node 10 to determine if there is a connectivity or communication problem (e.g. if the node 10 is becoming less well-synchronised or is becoming out-of-sync with a coordinator device 22 in the network). To solve the problem, or to reduce the risk of network failure from synchronisation loss, the node 10 adjusts when the next message is to be transmitted by the node 10. As explained earlier, each node 10 may transmit a message at a random point within a time frame for message transmission. However, if the node 10 identifies a potential synchronisation problem and potential for network failure, the node 10 adjusts when the message is to be transmitted, such that the random selection of a transmission point is overridden. For example, the node 10 may transmit the message as soon as possible in the current or subsequent time frame for message transmission, to prevent further delays in propagating the message through the network. In other words, as soon as a node 10 realises that it is becoming less well-synchronised with the coordinator device 22, the node 10 sends the most up-to-date message it has received sooner than if the node was transmitting messages at a random time in each time frame, to try to update nearby nodes quickly.

Thus, in embodiments, there is provided an apparatus 10 in a communication network, the apparatus comprising: a timer 20 for: starting a time frame for message transmission; and timing a time delay between receiving messages at the apparatus; and a communication module 12 for: receiving a first message, the first message having a first indicator; receiving a second message, the second message having a second indicator; determining whether the first indicator and the second indicator are different, and if so, obtaining, from the timer, a time delay between receiving the first message and the second message; determining if the time delay exceeds the duration of the time frame; and adjusting, responsive to the time delay determination, when a message is to be transmitted.

In embodiments, the communication module 12 may transmit a message at a randomly-selected point in the time frame for message transmission if the time delay does not exceed the duration of the time frame. In other words, if the second message is received by the communication module 12 within an expected time for receiving messages (which may be equal to the length of the time frame for message transmission), the communication module 12 determines that it is still well-connected to, or well-synchronised with, the coordinator device 22, and as a result, does not need to adjust when the next transmission occurs.

However, if the time delay between receiving the first and second messages is greater than the duration of the time frame for message transmission, the node 10 adjusts when a message is to be transmitted by using the communication module to stipulate a specific point at which a message is to be transmitted. The specific point may be within the current time frame for message transmission (if still running), the subsequent time frame for message transmission, or at another point in time (e.g. immediately). In other words, if the node 10 receives an update (i.e. a new message) after a long time, the node 10 may send the update quickly to ensure other nodes receive the update as soon as possible.

Figure 5:
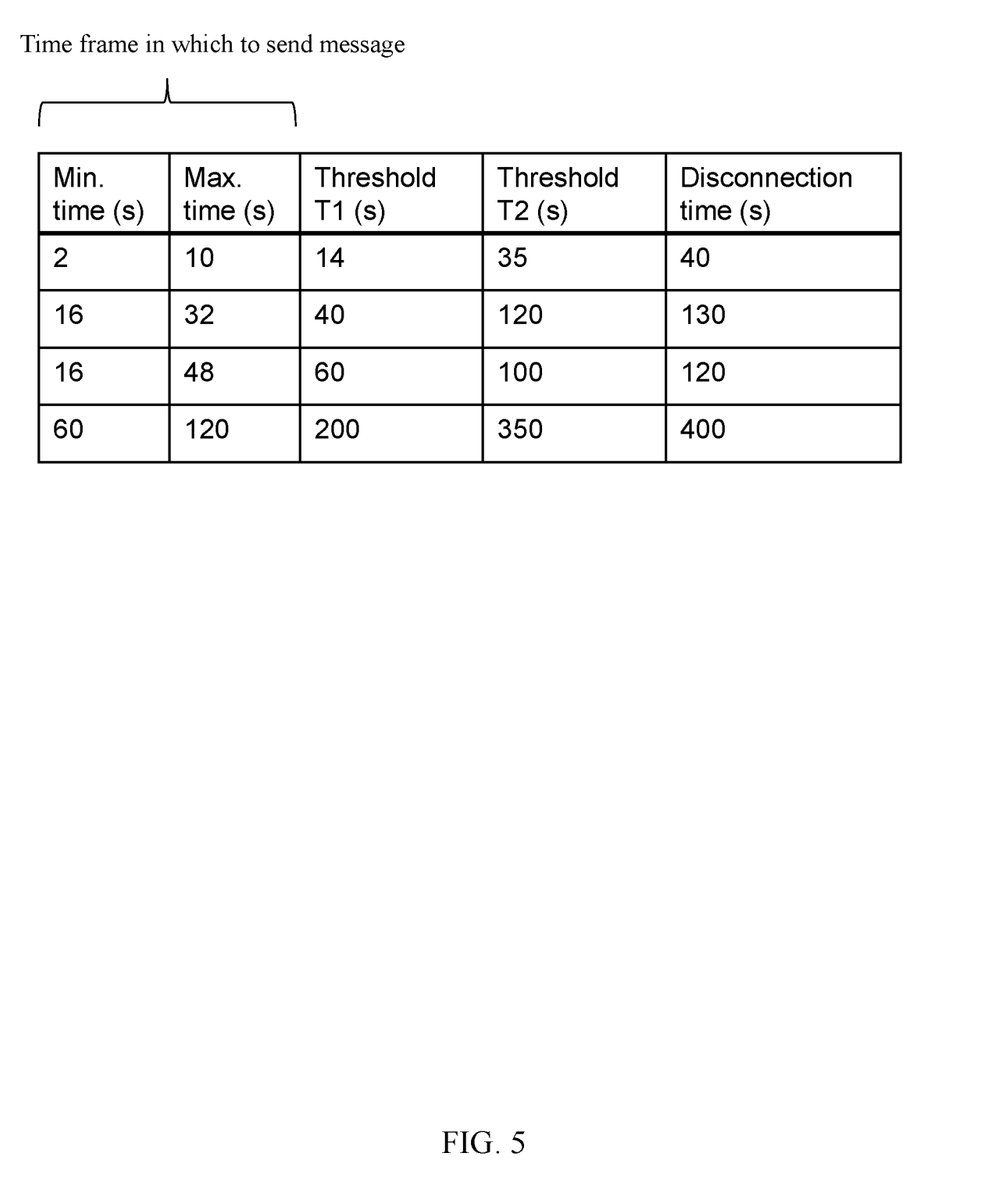
FIG. 5 is a table showing example time frames in which a node transmits a message, and the threshold time delays that may trigger the node to change when a message is transmitted.

The communication module 12 may determine how to adjust the time when a message is to be transmitted based on how large the time delay is between receiving the first and second messages. FIG. 5 is a table showing example time frames for message transmission, and the threshold time delays that may trigger the node to adjust when a message is transmitted. For example, in one embodiment, the communication module 12 may transmit a message once within a time frame of between two seconds and ten seconds. In this embodiment, the communication module 12 may expect to receive a new message between every two and ten seconds. If a new message is received within this period of time, the communication module 12 may assume that the node 10 is well-connected to, or well-synchronised with, the coordinator device 22 of the network. In this case, the communication module 12 may not adjust when a message is transmitted. However, if the time delay between receiving the first and second messages falls outside of this period of time, but is below a first threshold time T1 (14 seconds), the communication module 12 may hasten the next message transmission because it determines that the node 10 may be losing connection to, or becoming less synchronised with, the coordinator device 22. Similarly, if the time delay falls outside of the time period in which a new message is expected, but is equal to, or close to a second threshold time T2 (35 seconds), the communication module 12 may transmit the next message immediately, because it determines the node 10 (and/or other nearby nodes) is close to losing connection to the coordinator device 22. This action may stop the synchronisation error from propagating through the network. However, if the time delay between the first and second messages is equal to or greater than a disconnection time (40 seconds in this example), the communication module 12 assumes that it has lost connection to the coordinator device 22, and therefore lost connection to the communication network. At this stage, the node 10 needs to take action to reconnect to the communication network and resynchronise with the coordinator device 22.

The apparatus may have become disconnected from the coordinator device 22 because the coordinator device 22 has failed, or because the network has partitioned or been split due to other node devices (that are located between the apparatus and the coordinator device) losing connectivity to the coordinator device 22. Whatever the cause of the disconnection, the apparatus 10 may take action to reconnect to the communication network by searching for the original coordinator device 22 and the try to connect to the network partition in which the original coordinator device 22 is located. Alternatively, the apparatus 10 may take action to search for any network partition that can join. For example, another apparatus may have formed a new network partition as a result of losing connectivity to the coordinator device 22, and the apparatus 10 may seek to join this new partition. If the apparatus 10 cannot find a new network partition to join, the apparatus 10 may form its own network partition and begin acting as the coordinator of that partition.

Other nodes/apparatus may have lost their connection to the coordinator device 22 and may therefore, begin to take the same actions as apparatus 10. This may result in the situation that multiple small partitions form in place of the original large network. However, nodes/apparatus may begin merging the smaller network partitions. Each network partition may comprise a partition identifier that also indicates how many nodes/apparatus the partition contains. By default, the apparatus 10 (and all other nodes) joins the largest partition, such that a single network with a single coordinator device 22 is reformed. The coordinator device in the reformed network may not be the same as the original coordinator device. This process of network partitioning and network reformation is a surprisingly fast operation, such that networks that do fail may reform and resume normal operation quickly.

FIG. 5 shows other example time frames for message transmission, and their corresponding threshold times T1 and T2 and disconnection times. It will be understood that these are merely illustrative examples, and are non-limiting. The precise time frames, threshold times and disconnection times may be communication protocol-dependent.

Thus, in embodiments, if the time delay between receiving the first message and the second message exceeds the duration of the time frame, the communication module 12 may determine if the time delay is less than or equal to a first threshold time delay T1, and if so, may stipulate that a message is to be transmitted at the start of a subsequent time frame for message transmission.

In embodiments, if the time delay exceeds the duration of the time frame, the communication module 12 determines if the time delay is greater than the first threshold time delay T1, and equal to or approaching a second threshold time delay T2, and if so, transmits a message immediately.

In embodiments, if the time delay exceeds the second threshold time delay T2 and is greater than or equal to a disconnection time, the communication module 12 determines that the apparatus has lost connectivity to the communication network; and takes action to reconnect to the communication network, as outlined above.

The message to be transmitted by the apparatus 10 may depend on whether the first message is newer/more up-to-date than the second message, or vice versa. That is, the communication module 12 is generally configured to transmit the newest message (i.e. the most up-to-date message) that it has received whenever it makes a transmission. Due to the way transmissions are made within a communication network, a node 10 may not necessarily receive messages in the chronological order in which the messages were sent by the coordinator device. Accordingly, the second message may not necessarily be the newer message. Thus, the communication module 12 may need to determine which of the first and second message is the newer message, in order to transmit the newer message. As mentioned earlier, this determination may depend on the type of indicator used in the first and second messages.

Thus, generally speaking, the communication module 12 may determine which message is to be transmitted by: comparing the first indicator of the first message and the second indicator of the second message, determining, responsive to the comparing, whether the second message is newer than the first message, and transmitting the received second message if the second message is newer. If, on the other hand, the first message is determined to be the newer message, the communication module 12 will transmit the first message. If the communication module 12 determines that the first indicator and the second indicator are identical/equal, the communication module 12 assumes the first and second message are the same, and may transmit either of the messages if they are the newest messages received by the communication module 12.

In embodiments, the first indicator and the second indicator are both numerical indicators. The coordinator device 22 may increase the numerical value of the indicator whenever it sends a new message, such that a higher numerical indicator value indicates a newer message. In this case, the communication module may determine if the second message is newer than the first message if the second numerical indicator is greater (i.e. a bigger number) than the first numerical indicator.

In embodiments, the first indicator and the second indicator are both alphanumeric indicators. The coordinator device 22 may increase the alphanumeric value of the indicator whenever it sends a new message, in a predefined way, such that a higher alphanumerical indicator value indicates a newer message. For example, the alphanumeric indicators may begin at A0 and incrementally increase to A9, then B0, B1, etc. up to Z9, before either beginning again at A0, or continuing to AA0, for example. In this case, the communication module may determine if the second message is newer than the first message if the second alphanumeric indicator is greater than the first alphanumeric indicator.

In embodiments, the first indicator and the second indicator are both timestamps. In this case, the communication module 12 may determine if the second message is newer than the first message by determining a chronological order of the first timestamp and the second timestamp.

In embodiments, the first indicator and the second indicator are random sequences of characters (e.g. numbers, letters, special characters). The indicator may be randomly generated by the coordinator device 22 when a new message is transmitted by the device. In this case, the first and second indicators alone may not enable the communication module 12 to determine which of the first and second messages is the newer message. Thus, in this case, the communication module may determine if the second message is newer than the first message by determining if the second message was received within a period of time in which a new message is expected. That is, if the communication module 12 determines the first and second indicators are different, the communication module 12 may simply assume that if the second message was receives within a period of time in which a new message is expected to be received, then the second message is the newer message.

The communication module 12 may comprise a data store 14. The data store 14 may be configured to store messages when they are received by the communication module 12. Thus, the data store 14 may store the first message when the first message is received by the communication module 12. If, after receiving a second message, the communication module 12 determines that the second message is newer than (i.e. more up-to-date than) the first message, then the apparatus may remove the stored first message and may store the received second message in the data store 14.

Thus, as explained herein, if the apparatus 10 determines that it is starting to become out-of-sync with the coordinator device 22 in the network, the apparatus 10 attempts to mitigate the problem by sending a new message faster or as soon as possible, to enable other nodes to receive the new message sooner. In this way, the node 10 'catches-up' with the coordinator device 22 and tries to prevent synchronisation errors from propagating through the network.

The adjustment made to the point at which a message is to be transmitted may be temporary, and may vary depending on the magnitude of the time delay between receiving messages, as explained above and shown in FIG. 5.

In embodiments, the communication network may comprise a plurality of nodes arranged in a mesh topology, and the communication module 12 of each node 10 may be configured to transmit a message by broadcasting the message to at least one node of the plurality of nodes. Additionally or alternatively, the communication network may comprise a plurality of nodes arranged in a line topology, and the communication module 12 of each node 10 may be configured to transmit a message by unicasting (or otherwise) the message to a neighbouring node in the line topology.

Figure 4:
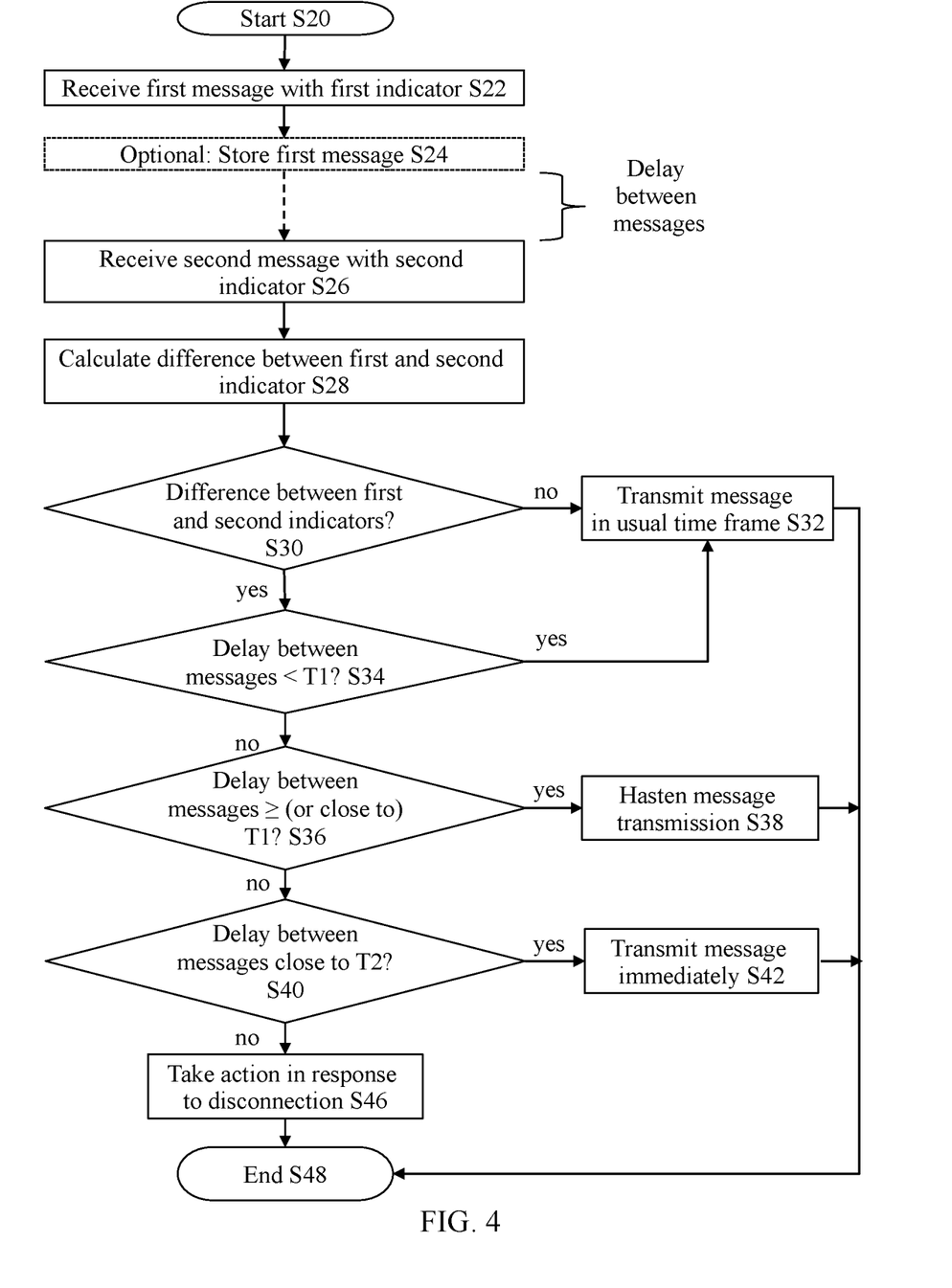
FIG. 4 is a flow diagram of example steps to detect a communication error in a communication network and to correct the error.

Turning now to FIG. 4, this shows a flow diagram of example steps to detect a communication/synchronisation error in a communication network and to take steps to mitigate the effect of the synchronisation error to the rest of the communication network. The process begins at start step S20 and at step S22, the node 10 receives a first message from a nearby node or coordinator device 22. The first message comprises a first indicator, e.g. an index value for a heartbeat message, a version number for code contained in the message, a timestamp indicating when the message was generated, etc. The node 10 may optionally store the first message S24 in data store 14, and may transmit the message to nearby nodes.

Some time later (as indicated by the dashed arrow), the node 10 receives a second message having a second indicator (preferably of the same type as that of the first indicator) (step S26). There is a time delay between receiving the first message and receiving the second message: this time delay may be monitored/tracked or otherwise determined by timer 20 of node 10. At step S28, the node 10 calculates a difference between the first indicator of the first message, and the second indicator of the second message, to determine if the messages are different. If the messages are not determined to be different (i.e. because the first and second indicators are identical), the communication module of node 10 transmits a message in the default time frame for transmission (which may be protocol-dependent) (step S32). The message transmitted by the communication module 12 may be either the first or second message, or may be another message if this is determined to be newer than the first or second message.

If, at step S30, the messages are determined to be different (because the first and second indicators are different), the communication module of node 10 determines the time delay between receiving the first and second messages. Specifically, the communication module determines if the time delay is below a first threshold T1 (step S34). If the time delay is below the first threshold T1, the communication module assumes that it is still well connected to, or well-synchronised with, the coordinator device 22. In this case, the communication module transmits a message at a random point within the time frame for message transmission, as described above (step S32).

If the time delay is not less than the first threshold T1, the communication module determines if the time delay is equal to the first threshold T1, or greater than but close to the first threshold T1. In this case, the node 10 determines that it is starting to become less synchronised with the coordinator device 22, and therefore, adjusts when the next message is to be transmitted. Specifically, the node 10 hastens the message transmission (step S38), to reduce the risk of other nodes become less synchronised.

If the time delay is greater than the first threshold T1 and close to, or equal to, a second threshold T2, the communication module determines that it is close to losing connection to, and synchronisation with, the coordinator device 22. In this case, the communication module performs the next message transmission immediately (step S42).

If the time delay is greater than the second threshold T2 and above a disconnection time (see e.g. FIG. 5), the communication module assumes that the node 10 has lost connection to the coordinator device 22, and therefore has lost connection to the communication network. In this case, the node 10 takes action in response to the disconnection, in order to reconnect to the network and coordinator device 22, as explained above. However, the actions performed by the communication node in response to the determinations made in steps S34, S36 and S40 should reduce the probability of the node 10 becoming disconnected. The process then ends at step S48.

Thus, in embodiments, there is provided a method for identifying message propagation delays in a communication network, the method comprising: receiving a first message having a first indicator; receiving a second message having a second indicator; determining whether the first indicator and the second indicator are different, and if so, determining a time delay between receiving the first message and receiving the second message; determining if the time delay exceeds a duration of a time frame for message transmission; and adjusting, responsive to the time delay determination, when a message is to be transmitted.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A node for communication in a communication network including multiple nodes, the multiple nodes having a coordinating node that transmits a series of synchronizing messages, each synchronizing message including a message time indicator, the node comprising circuitry configured to:
   receive at the node a first synchronizing message transmitted by one of the multiple nodes, the first synchronizing message having a first synchronizing message time indicator;
   receive at the node a second synchronizing message transmitted by one of the multiple nodes, the second synchronizing message having a second synchronizing message time indicator;
   determine whether the first synchronizing message time indicator and the second synchronizing message time indicator are different, and if so,
   determine a time delay between receiving the first synchronizing message and the second synchronizing message;
   determine if the time delay exceeds a duration of a time frame for transmitting a synchronizing message; and
   adjust, responsive to the time delay determination, when a synchronizing message is to be transmitted.

2. The node as claimed in claim 1, wherein the circuitry is configured to transmit a synchronizing message at a randomly-selected point in the time frame for synchronizing message transmission if the time delay does not exceed the duration of the time frame.

3. The node as claimed in claim 1, wherein adjusting when a synchronizing message is to be transmitted comprises using the circuitry to:
   stipulate a specific point at which a synchronizing message is to be transmitted.

4. The node as claimed in claim 1, wherein if the time delay exceeds the duration of the time frame, the circuitry is configured to:
   determine if the time delay is less than or equal to a first threshold time delay T1, and if so,
   stipulate that a synchronizing message is to be transmitted at a start of a subsequent time frame for synchronizing message transmission.

5. The node as claimed in claim 4, wherein if the time delay exceeds the duration of the time frame, the circuitry is configured to:
   determine if the time delay is greater than the first threshold time delay T1, and equal to or approaching a second threshold time delay T2, and if so,
   transmit a synchronizing message immediately.

6. The node as claimed in claim 5, wherein if the time delay exceeds the second threshold time delay T2 and is greater than or equal to a disconnection time, the circuitry is configured to:

determine that the node has lost connectivity to the communication network; and take action to reconnect the node to the communication network.

7. The node as claimed in claim 1, wherein the circuitry is configured to determine which synchronizing message is to be transmitted by:

comparing the first synchronizing message indicator of the first synchronizing message and the second synchronizing message indicator of the second synchronizing message, determining, responsive to the comparing, whether the second synchronizing message is newer than the first synchronizing message, and transmitting the received second synchronizing message if the second synchronizing message is newer.

8. The node as claimed in claim 7, wherein the first synchronizing message time indicator is a first numerical indicator and the second synchronizing message time indicator is a second numerical indicator, and wherein the circuitry is configured to determine if the second synchronizing message is newer than the first synchronizing message if the second numerical indicator is greater than the first numerical indicator.

9. The node as claimed in claim 7, wherein the first synchronizing message time indicator is a first alphanumeric indicator and the second synchronizing message time indicator is a second alphanumeric indicator, and wherein the circuitry is configured to determine if the second synchronizing message is newer than the first synchronizing message if the second alphanumeric indicator is greater than the first alphanumeric indicator.

10. The node as claimed in claim 7, wherein the first synchronizing message time indicator is a first timestamp and the second synchronizing message time indicator is a second timestamp, and wherein the circuitry is configured to determine if the second synchronizing message is newer than the first synchronizing message by determining a chronological order of the first timestamp and the second timestamp.

11. The node as claimed in claim 7, wherein the first synchronizing message time indicator is a first random sequences of characters and the second synchronizing message time indicator is a second random sequences of characters, and wherein the circuitry is configured to determine if the second synchronizing message is newer than the first message by determining if the second synchronizing message was received within a period of time in which a new synchronizing message is expected.

12. The node as claimed in claim 1, further comprising a data store to store the first synchronizing message when the first synchronizing message is received by the circuitry.

13. The node as claimed in claim 12, wherein the node is configured to remove the stored first synchronizing message and to store the received second synchronizing message in the data store if the second synchronizing message is newer than the first synchronizing message.

14. The node as claimed in claim 1, wherein the communication network comprises a plurality of nodes arranged in a mesh topology, and the circuitry is configured to transmit a synchronizing message by broadcasting the synchronizing message.

15. The node as claimed in claim 1, wherein the communication network comprises a plurality of nodes arranged in a line topology, and the circuitry is configured to transmit a synchronizing message by unicasting the synchronizing message to a neighbouring node in the line topology.

16. A method for identifying message propagation delays in a communication network including multiple nodes, the multiple nodes having a coordinating node that transmits a series of synchronizing messages, each synchronizing message including a message time indicator, the method comprising one of the nodes:

receiving a first synchronizing message transmitted by one of the multiple nodes, the first synchronizing message having a first synchronizing message time indicator;

receiving a second synchronizing message transmitted by one of the multiple nodes, the first synchronizing message having a second synchronizing message time indicator;

determining whether the first synchronizing message time indicator and the second synchronizing message time indicator are different, and if so, determining a time delay between receiving the first synchronizing message and receiving the second synchronizing message, where the time delay is a difference in time between arrival of the first synchronizing message and the second synchronizing message at the node;

determining when a time delay exceeds a duration of a time frame for transmitting a synchronizing message; and advancing, responsive to the time delay determination, when a synchronizing message is to be transmitted.

17. A non-transitory data carrier carrying code which, when implemented on a processor, causes the processor to carry out the method recited in claim 16.

18. The method as claimed in claim 16, wherein the advancing of when the synchronizing message is to be transmitted reduces a risk of the node losing connectivity with the communications network.

19. The node as claimed in claim 1, wherein the circuitry is configured to advance, responsive to the time delay determination, when a synchronizing message is to be transmitted by the node to reduce a risk of the node losing connectivity with the communications network.

20. The node as claimed in claim 2, wherein the circuitry is configured to override a random selection point when the time delay exceeds the duration of the time frame.

* * * * *